US009053046B2

(12) United States Patent
Eidelman et al.

(10) Patent No.: US 9,053,046 B2
(45) Date of Patent: Jun. 9, 2015

(54) EDGE DEVICES SETTINGS VIA EXTERNAL SOURCE

(71) Applicant: NICE-SYSTEMS LTD, Ra'anana (IL)

(72) Inventors: Dan Eidelman, Holon (IL); Oren Deri, Herzliya (IL)

(73) Assignee: NICE-SYSTEMS LTD, Ra'anana (IL)

( * ) Notice: Subject to any disclaimer, the term of this patent is extended or adjusted under 35 U.S.C. 154(b) by 66 days.

(21) Appl. No.: 14/020,853

(22) Filed: Sep. 8, 2013

(65) Prior Publication Data

US 2015/0074296 A1 Mar. 12, 2015

(51) Int. Cl.
*G06F 3/00* (2006.01)
*G06F 13/10* (2006.01)

(52) U.S. Cl.
CPC ...................................... *G06F 13/10* (2013.01)

(58) Field of Classification Search
CPC ........ G06F 3/00; G06F 13/00; G06F 2003/00
USPC .......................... 710/104–106, 8–10; 709/220
See application file for complete search history.

(56) References Cited

U.S. PATENT DOCUMENTS

| 8,458,363 | B2 * | 6/2013 | Rosenblatt et al. | 709/248 |
| 2010/0042954 | A1 * | 2/2010 | Rosenblatt et al. | 715/863 |
| 2010/0082784 | A1 * | 4/2010 | Rosenblatt et al. | 709/222 |
| 2011/0162048 | A1 * | 6/2011 | Bilbrey et al. | 726/4 |

OTHER PUBLICATIONS

Electric Imp, Inc. http://electricimp.com/product.

* cited by examiner

*Primary Examiner* — Christopher Shin
(74) *Attorney, Agent, or Firm* — Soroker-Agmon (57) ABSTRACT

A method for externally configuring a device, wherein the device is devised for configuring, comprising positioning in a sufficient proximity external to the device a portable object provided with a representation of a configuration data for the device, wherein the representation is according to a standard non-custom industrial practice, further obtaining by the device the representation from the portable object, deciphering the representation into the configuration data by the device, and responsively configuring the device according to the configuration data by the device, and an apparatus for performing the same.

24 Claims, 9 Drawing Sheets

EDGE DEVICES SETTINGS VIA EXTERNAL SOURCE

BACKGROUND

The present disclosure generally relates to edge devices, and more specifically to remotely setting or configuring of edge devices.

Attempts for remotely setting of devices are known, for example, as portrayed in http://electricimp.com/product/. Such devices generally require custom hardware at least in the remote controller and, possibly, in the controlled device as well.

SUMMARY

One exemplary embodiment of the disclosed subject matter is a method for externally configuring a device, wherein the device is devised for configuring, comprising positioning in a sufficient proximity external to the device a portable object provided with a representation of a configuration data for the device, wherein the representation is according to a standard non-custom industrial practice, further obtaining by the device the representation from the portable object, deciphering the representation into the configuration data by the device, and responsively configuring the device according to the configuration data by the device.

Another exemplary embodiment of the disclosed subject matter is an apparatus constructed for external configuration, comprising a device devised for configuring by incorporating therein an at least one standard non-custom industrial component, and constructed to obtain from a portable object a representation of a configuration data for the device, wherein the representation is according to a standard non-custom industrial practice.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

DETAILED DESCRIPTION

In the context of the present disclosure, without limiting, an edge device denotes a device connectable to a network and remotely configurable at least without custom hardware, or at most with industry standard commercial equipment.

An edge device according to the present disclosure is a computerized device having at least one processor, networking equipment, one or more memory components storing one or more programs executable by the at least one processor, wherein at least one memory component is adapted for addition and/or modifying the contents thereof.

Generally, without limiting, the edge device is a stand-alone device without a screen or a user interface.

For brevity and clarity and without limiting, in the present disclosure the term 'camera' denotes an edge device capable of and positioned for capturing an image in visible light.

For brevity and clarity and without limiting, in the present disclosure the term 'blind', such as a blind device, refers to an edge device that is not capable and/or not positioned for capturing an image in visible light.

In the context of the present disclosure, without limiting, the term 'QR-code' (Quick Response Code, Trademark of Denso Wave Incorporated) denotes and/or represents any graphical pattern encoding decodable information.

In the context of the present disclosure, without limiting, the term 'NFC' (Near field communication) denotes radio communication between devices, and with respect to an apparatus NFC denotes any industry standard equipment for radio communication between devices that are sufficiently proximate spatially to each other.

In the context of the present disclosure, the term 'network' denotes any communications network where, for clarity and brevity, a network operative according to an Internet Protocol as known in the art is assumed as a non-limiting example.

In the context of the present disclosure, without limiting, referring to 'IP' denotes an IP address and/or number as known in the art, and unless particularly specified, other values and/or parameters relating to the IP address necessary for network communication, such as subnet mask and/or MAC address and/or gateway address and/or credentials such as device name and/or password are assumed as well.

The terms cited above denote also inflections and conjugates thereof.

One technical problem dealt by the disclosed subject matter is remotely configuring a camera for operation in a network.

One technical solution according to the disclosed subject matter a camera pre-configured with suitable software for capturing a QR-code encoded with data comprising settings for the camera, decoding the QR-code data, and for employing data to self-configure the camera.

Subsequently, once the QR-code is presented in the field of view of the camera, the camera captures the image of the QR-code and configures itself according to the data encoded in the QR-code.

Generally, without limiting, the data encoded in the QR-code includes an IP as a static IP or a dynamic IP such via DHCP protocol, and optionally other data elements such as identification and/or security information.

In some embodiments, the data in the QR-code is used for connecting to a server thereby notifying the server of the settings of the camera, where, optionally, the server consequently provides the camera with modified and/or extended data for alternatively and/or further configuring the camera.

Another technical problem dealt by the disclosed subject matter is remotely configuring a blind device for operation in a network.

Another technical solution according to the disclosed subject matter is a blind device fitted with equipment for NFC communication comprising an NFC receiver and/or a transceiver, and configured with suitable software for interacting with an NFC device for capturing data comprising settings for the blind device and for employing data to self-configure the blind device.

Subsequently, once the NFC device is sufficiently close and/or proximate to the NFC transceiver, the blind device captures data from the NFC device and configures itself according to the captured data.

Generally, without limiting, the data captured by the blind includes an IP as a static IP or a dynamic IP such via DHCP protocol, and optionally other data elements such as identification and/or security information.

In some embodiments, the captured data is used for connecting to a server thereby notifying the server of the settings of the blind device, where, optionally, the server consequently provides the blind device with modified and/or extended data for alternatively and/or further configuring the blind device.

It is noted that a camera may also be configured as a blind device.

In some embodiments, a plurality of edge devices, possibly including tens or hundreds of edge devices are deployed in a site such as a building or a road or a neighborhood.

Thus, after pre-configuring the edge devices, the plurality of devices can be remotely configured for operation either locally by an image or an NFC device, or further or alternatively configured from a server, as described above.

A potential technical effect of the disclosed subject matter is remotely configuring a plurality of edge devices having only off-the-shelf commercial equipment.

A non-limiting overview of practicing configuration of edge devices according to the present disclosure is presented below. The overview outlines exemplary practice of embodiments of the present disclosure, providing a constructive basis for variant and/or alternative and/or divergent embodiments, some of which are subsequently described.

Generally, without limiting, two basic techniques of configuring edge devices are presented, where the configuration mainly pertains to operation in a network, though the configuration may involve other settings as well.

In one technique the edge devices are independently configured locally and separately, whereas subsequently, optionally, the device registers itself in a server.

In another technique the edge devices are preliminarily configured locally and the configuration is remotely modified or extended by a server.

The local configuration technique depends on the characteristics of the edge devices. For example, imaging a QR-code by a camera, or data received by a blind device via NFC communication. Optionally or additionally, other methods may be used for locally configuring an edge device, such as ultrasound (US) or infra-red (IR) radiation that are optionally modulated.

Generally, without limiting, the edge devices are obtained from a manufacturer, optionally with no networking configuration and/or some default configuration, and are devised for configuration by adaptation and/or augmentation and/or modification by software and/or hardware, collectively referred to also a devised. Generally, at least in some embodiments, the edge devices are devised by incorporating therein standard non-custom industrial component and/or components for interacting with objects and/or devices that provide to the edge devices standard non-custom representation of data. In some embodiments, the representation is provided remotely and/or sufficiently close to the edge devices, such as by visual representation and/or communication, for example, by a graphical pattern such as a QR-code or a bar-code or by a NFC communication.

In some embodiments, the adaptation comprises software for communicating with a server by a networking protocol and for exchanging data with the server. Further, for a camera the adaptation comprises software for imaging and decoding a QR-code, or for a blind device the adaptation comprises electronic circuitry and software for receiving data from an NFC device, or the adaptation may comprise circuitry and software such as for receiving data via IR or US.

Generally, without limiting, the edge devices are constructed to operate or function for setup such as in a setup mode. In some embodiments, the edge devices are set in a setup mode upon power on. Optionally or additionally, the setup mode is set responsive to activating a control on the edge device such as a button. Optionally or alternatively, the edge device is operative for configuration along with the regular operation thereof. Generally, without limiting, subsequent to configuring, the edge device is set for regular or normal operation, optionally, responsive to activating a control on the edge device such as a button and/or automatically switching to a regular or normal mode after the configuration is completed.

In some embodiments, the techniques described above can be and/or are used for modifying a configuration of edge devices.

In some embodiments, the server, also referred to as an application server, is constructed with networking facilities such as a web service and with facilities for generating configuration data for edge devices. The generated configuration data is encoded in a QR-code for configuring a camera or implemented in a NFC device or, optionally, implemented in an IR or a US remote control.

In some embodiments, the server comprises an application for generating configuration codes and is operable with a device having user interface (UI), such as a graphical user interface (GUI), for interacting with the application. Optionally or alternatively, the application is operable separately from the server, though, in some embodiments, the application is operable on an apparatus linked to the server.

Figure 1A:
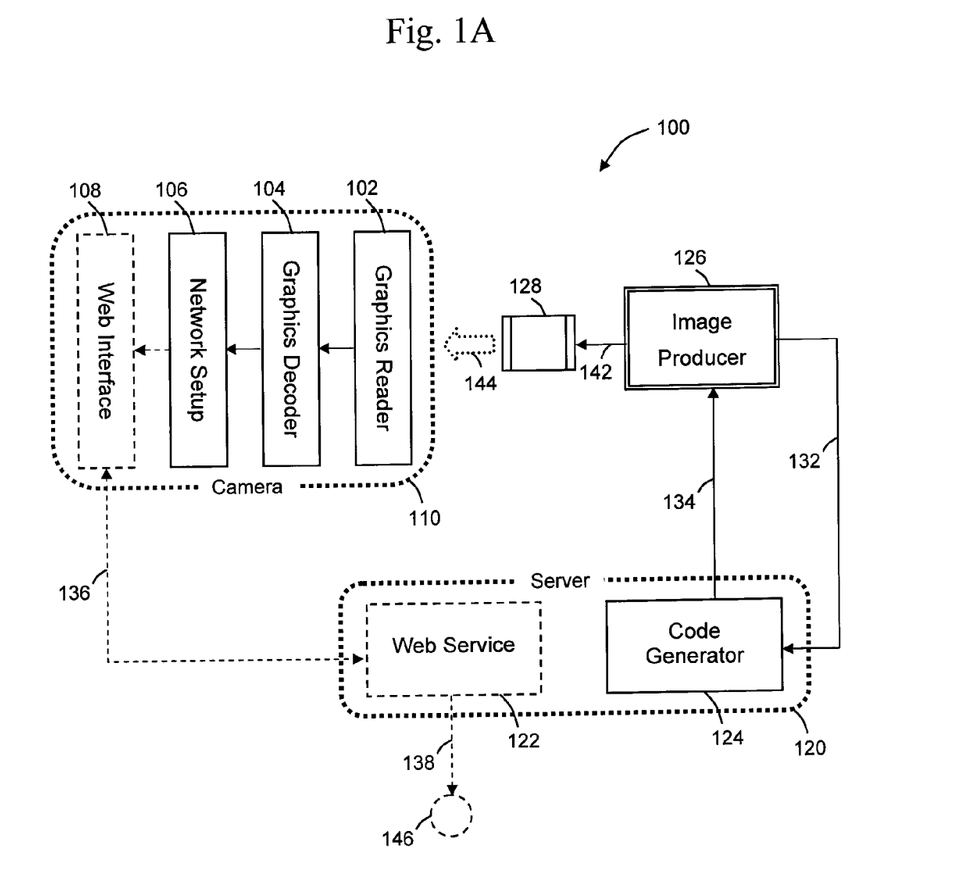
FIG. 1A schematically illustrates a system for independently configuring a camera, according to exemplary embodiments of the disclosed subject matter.

FIG. 1A schematically illustrates a system 100 for independently configuring a camera 110, according to exemplary embodiments of the disclosed subject matter.

System 100 further comprises a code generator 124 as a component comprising software and/or hardware for generating configuration data for camera 110 in an encoded form and/or any suitable form, also referred to as a configuration code. In some embodiments, code generator 124 obtains information for configuring or setting of camera 110 from a storage device (not shown), where, for example, the information is provided by a user or received otherwise.

In some embodiments, code generator 124 is physically comprised in a server 120, where, optionally or alternatively, code generator 124 is separate from and/or linked with server 120. By way of a non-limiting example, code generator 124 is assumed to be comprised in server 120.

System 100 further comprises an image producer 126 as a device or a component capable of and/or configured for producing and/or depicting and/or rendering QR-codes according to the configuration code generated by code generator 124. In some embodiments, image producer 126 is capable of and/or configured for interacting with code generator 124 for requesting and subsequently receiving configuration code for camera 110.

In some embodiments, image producer 126 renders the QR-code on a portable article such as a paper. Optionally or alternatively, the QR-code is sent, such as by an email, to a portable device capable of and/or configured for displaying the QR-code. Optionally or alternatively, image producer 126 is a portable device capable of and/or configured for displaying the QR-code, for instance, a smartphone as known in the contemporary art. For generality, without limiting, the QR-code is depicted on an object which is independently portable and/or comprised in a portable article, collectively referred to as a visual object 128.

Camera 110 comprises, in addition to optical and imaging capturing apparatus, a graphics reader component 102 designed and/or constructed for identifying and/or capturing a QR-code, and a graphics decoder component 104 for decoding the identified and/or captured QR-code into a suitable format and/or arrangement for configuring of camera 110. Camera 110 further comprises a network setup component 106 constructed for setting and/or configuring of camera 110 for networking according to the data decoded by graphics decoder component 104 from the QR-code.

Thus, in some embodiments, a user, such as a person assigned for configuring cameras, operates image producer 126 to request from code generator 124 a configuration code for camera 110, as illustrated schematically by an arrow 132. Responsively, code generator 124 provides image producer 126 with the configuration code, as illustrated schematically by an arrow 134.

Having acquired the configuration code, image producer 126 renders the configuration code in or on visual object 128 as a QR-code, as illustrated schematically by an arrow 142. Subsequently, the user presents visual object 128 externally to camera 110 sufficiently close and/or proximate to camera 110 in the field of view of camera 110, as illustrated schematically by an arrow 144.

Consequently, camera 110 identifies and captures the QR-code by graphics reader component 102 and decodes the QR-code by graphics decoder component 104, and sets the networking configuration by network setup component 106 according to the data decoded from the QR-code such as by setting an IP. Thus, camera is operable to participate in a network such as a web network. Generally, without limiting, the IP is set as a static IP.

In some embodiments, camera 110 provides an indication on the success and/or failure of the configuration, for example, by beeps or lights that are different for success or failure.

In some embodiments, optionally, server 120 is constructed with a web service 122, and camera 110 is constructed, optionally, with a web interface component 108 capable of and/or configured for network communication such as in a web network.

Thus, in some embodiments, responsive to configuring for networking by network setup component 106, camera 110 optionally utilizes web interface component 108 to communicate with web service 122, as illustrated by a dashed arrow 136, to notify server 120 about the configuration of camera 110, such as the IP or other network setting and/or credentials thereof. Responsively, in some embodiments, web interface component 108 acknowledges the settings to camera 110 and optionally registers camera 110 in server 120, for example, as a confirmed device.

In some embodiments, the result of the communication between camera 110 and server 120, either as a success or a determined failure, is indicated as schematically illustrated by a dashed arrow 138 on a user-readable device such a screen, generally denoted as a display 146.

In some embodiments, the configuration of camera 110 comprises, in addition to IP, other data such as credentials of camera 110. Accordingly, in some embodiments, when communicating with web service 122, camera 110 provides at least some of the other data to server 120.

It is noted that camera 110 is set or is operating in a setup mode for configuring of camera 110, and subsequently, optionally, camera 110 is set to a normal operation.

In some embodiments, the QR-code is generated and decoded according to the ISO/IEC 18004 standard. Optionally, other methods may be used to generate and decode the QR-code, such as by a custom algorithm. In some embodiments, other graphical codes, such bar-codes, may or are used instead of a QR-code.

Figure 1B:
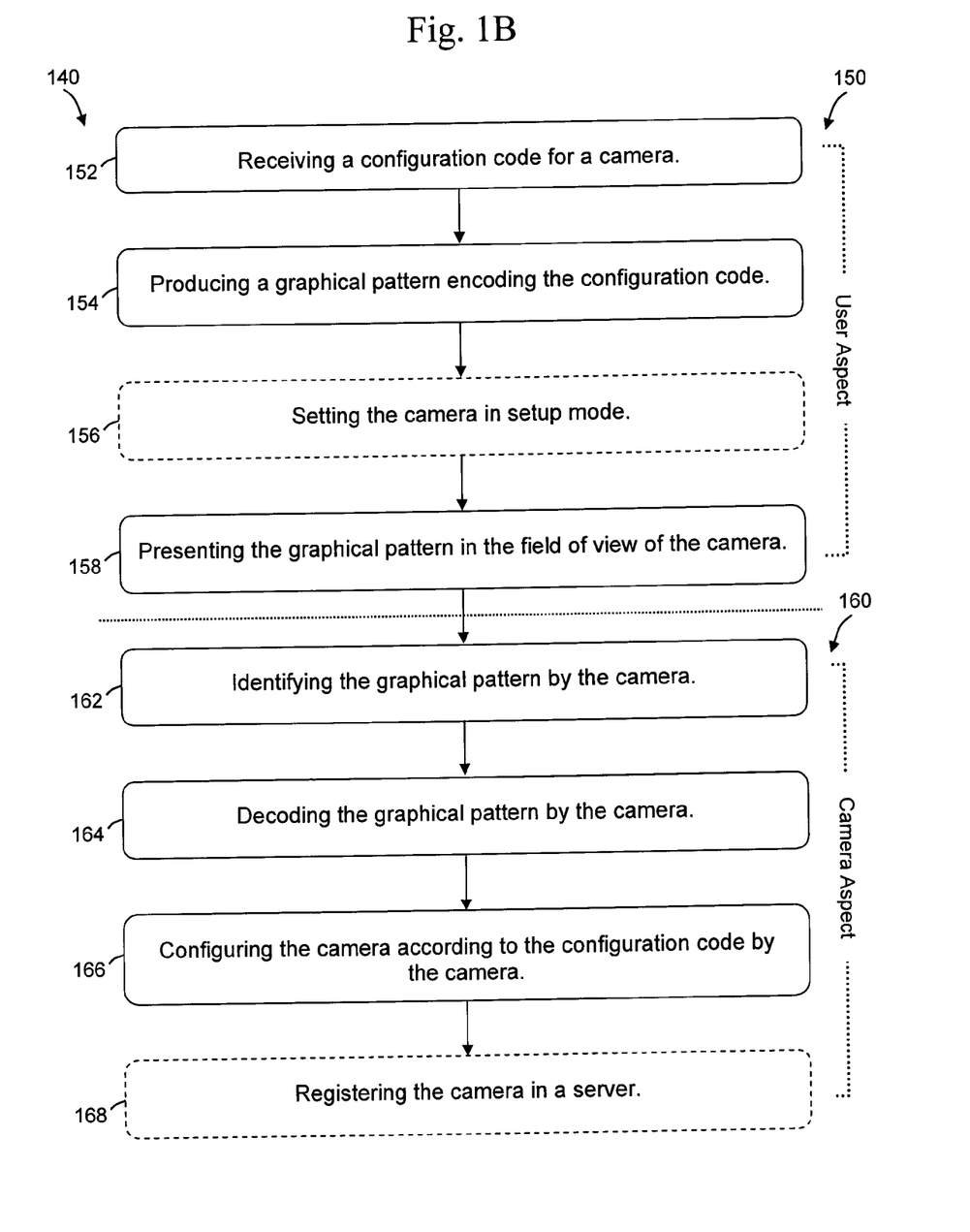
FIG. 1B outlines operations in independently configuring a camera, according to exemplary embodiments of the disclosed subject matter.

FIG. 1B outlines operations 140 in independently configuring of camera 110, according to exemplary embodiments of the disclosed subject matter. Operations 140 are divided to operations 150 and operations 160 for activities in the user side or aspect and activities in the camera side or aspect, respectively.

In operation 152 a device operated by a user receives a configuration code for a camera from a code generator. In some embodiments, the device requests the configuration code from the code generator which responsively provides the configuration code to the device. Generally the device and the code generator are linked, at least for the interaction therebetween.

In operation 154 the device produces a graphical pattern encoding the configuration code. For example, a QR-code or a bar-code.

In operation 156 in case the camera is not in a setup mode or the camera is not operable for configuration, the user or another user sets the camera in a setup mode, thereby preparing the camera for configuration.

In operation 158, as the camera is in a setup mode or operable for configuration, the user or another user presents the graphical pattern in the field of view of the camera in a sufficient proximity to enable the camera to identify and/or capture the graphical pattern.

In operation 162 the camera identifies the presented graphical pattern.

In operation 164 the camera decodes the identified graphical pattern, thereby acquiring the configuration code that was encoded in the graphical pattern and forming the configuration code in a suitable format for configuring the camera.

Generally the configuration code is encoded in the graphical pattern according to the decoding algorithm implemented in the camera. For example, the encoding and decoding of the graphical pattern are according and/or based on ISO/IEC 18004 standard.

In operation 166, based on suitable program implemented in the camera, the camera configures itself according to the configuration code. The configuration of the camera comprises an IP and optionally other data such as credentials such as name and password, thereby enabling the camera to participate in a network.

In operation 168, optionally, the camera communicates with a server that registers the camera therein, such as by the IP and/or credentials of the camera and/or by additional data of the camera.

In some embodiments, the configuration code represents data that pertains to a site in which the camera is installed or intended to be installed. Thus, when communicating in a network the camera is distinguished or isolated relative to cameras that are in another site. In some embodiments, the configuration code represents the data that pertains to a site by the IP and/or subnet mask and/or any data that can isolate, at least virtually, the site relative to other locations.

It is noted that operations 140 are applicable to a plurality of cameras, optionally with some variations. For example, the device may receive configuration codes for several cameras, and produces and presents the graphical patterns separately for each camera of the plurality of cameras.

It is noted that configuring a camera as described above can be used also to modify a configuration of a camera, optionally with some variations.

Figure 2A:
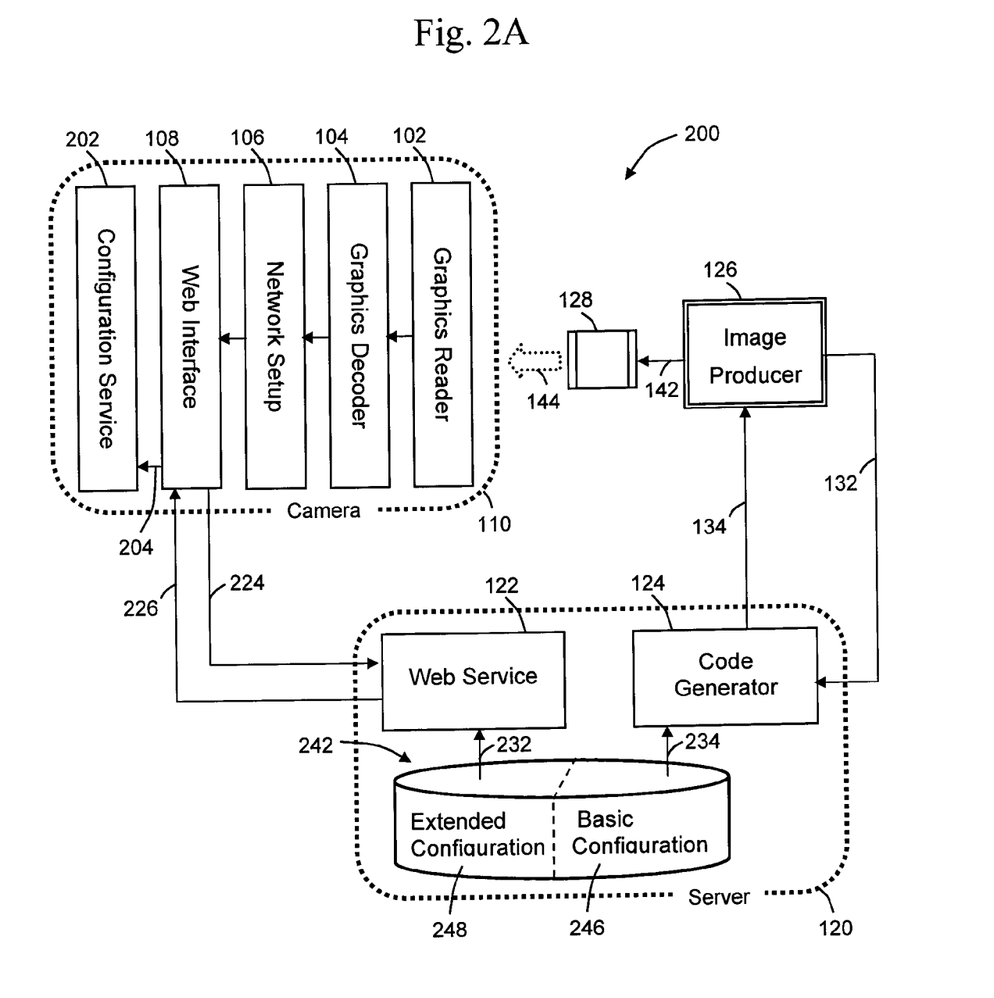
FIG. 2A schematically illustrates a system for dually configuring a camera in two stages, locally and centrally, according to exemplary embodiments of the disclosed subject matter.

FIG. 2A schematically illustrates a system 200 for dually configuring a camera in two stages, locally and centrally, according to exemplary embodiments of the disclosed subject matter.

System 200 is principally a variation of system 100 described above, where the components of system 100 are operative in system 200 mutatis mutandis, with some additional components and operations relative to system 100.

The description and operation of system 200 is generally presented with respect to system 100.

Camera 110 further comprises a configuration service component 202 capable of and/or configured for extending the camera configuration beyond a basic networking setup, as described below.

In some embodiments, server 120 comprises a storage 242, constructed for storing and retrieval of basic and extended configuration data of cameras, as schematically illustrated with parts 246 and 248, respectively. Storage 242 is comprised in server 120 as a non-limiting example, whereas optionally or alternatively, storage 242 is separate from and/or linked with server 120.

Code generator 124 retrieves basic configuration data of a camera from s such as an IP, as illustrated schematically by an arrow 234. Code generator 124 provides the basic configuration data, optionally as a code, to image producer 126 which renders the code as a graphical pattern such a QR-code. The graphical pattern is presented to camera 110 so that camera 110 decodes the graphical pattern and is set at least for a basic networking, as described above, optionally with credentials and/or identification of camera 110.

Consequently, camera 110 communicates with server 120 as schematically illustrated by an arrow 224 akin to dashed arrow 136 of system 100, thereby identifying camera 110 to server 120, such as by providing elements of the basic configuration of camera 110 as set by the basic configuration data decoded from the graphical pattern.

Subsequently, web service 122 retrieves from storage 242 extended configuration data for camera 110, as illustrated schematically by an arrow 232, and provides the extended configuration data to camera 110 by communicating therewith, such a via web interface component 108, as illustrated schematically by an arrow 226. Consequently, as illustrated by an arrow 204, web interface component 108 provides the extended configuration data to configuration service component 202 which extends the configuration of camera 110.

In some embodiments, the extended configuration comprises setting of camera 110 to DHCP rather than a static IP. Optionally, the extended configuration comprises security data such as by a PSIA or ONVIF protocols.

In some embodiments, configuration status as successful and/or failure is indicated by camera 110 such as by sound and/or light, and, optionally, also in server 120 such as by display 146.

Figure 2B:
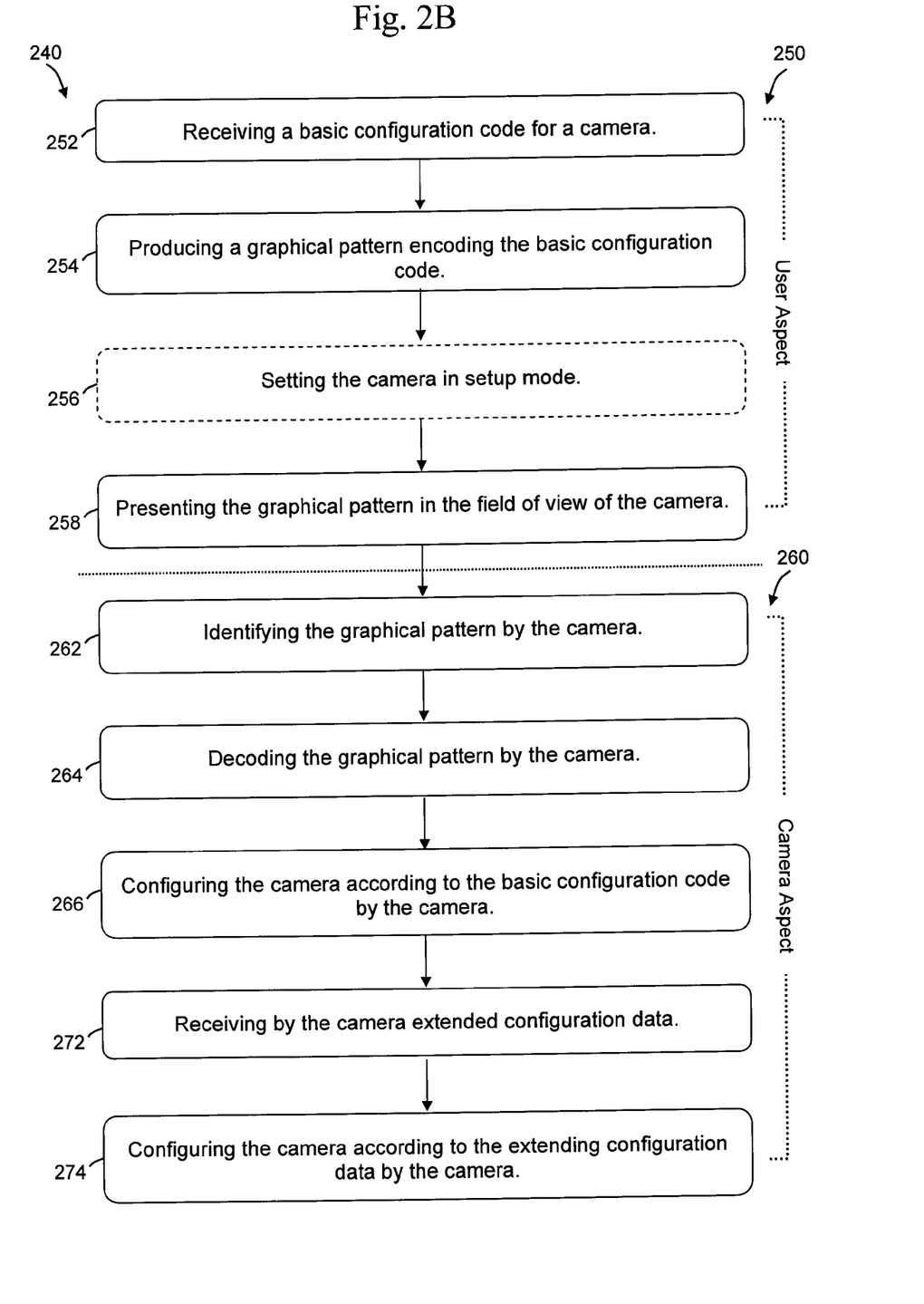
FIG. 2B outlines operations in dually configuring a camera, according to exemplary embodiments of the disclosed subject matter.

FIG. 2B outlines operations 240 in dually configuring a camera, according to exemplary embodiments of the disclosed subject matter. Operations 240 are divided to operations 250 and operations 260 for activities in the user side or aspect and activities in the camera side or aspect, respectively.

Some operations of operations 240 are analogous to corresponding operations 140, and for brevity and clarity are not repeatedly or redundantly described.

Specifically, a first set of operations, namely, operation 252, operation 254, operation 256, operation 258, operation 262, operation 264 and operation 266 are similar and/or analogous to a second set of operations, namely, operation 152, operation 154, operation 156, operation 158, operation 162, operation 164 and operation 166, respectively. A difference between the first set of operations and the second set of operations is that in the first set of operations the camera is completely configured and/or sufficiently configured, whereas in the second set of operations the camera is partially configured with basic configuration data and subsequently further configuration as follows.

Having been configured with basic configuration data that enables the camera for communication, in operation 272 the camera receives extended configuration data. For example, the camera communicates with a server that responsively provides the camera with extended configuration data.

In operation 257, the camera is configured according to the extending configuration data by the camera, thereby extending and/or upgrading and/or substituting the basic configuration of the camera.

In some embodiments, the basic configuration data and/or the extended configuration data of the camera represent data that pertain to a site in which the camera is installed or intended to be installed. Thus, when communicating in a network the camera is distinguished or isolated relative to cameras that are in another site.

It is noted that operations 240 are applicable to a plurality of cameras, optionally with some variations. For example, a plurality of basic configuration data sets respective to a plurality of cameras are provided to a device the device which produces and presents the graphical patterns separately for each camera of the plurality of cameras. Subsequently, the plurality of cameras connect with a server to obtain extended configuration data respective to the plurality of cameras It is noted that configuring a camera as described above can be used also to modify a configuration of a camera, optionally with some variations.

Figure 3A:
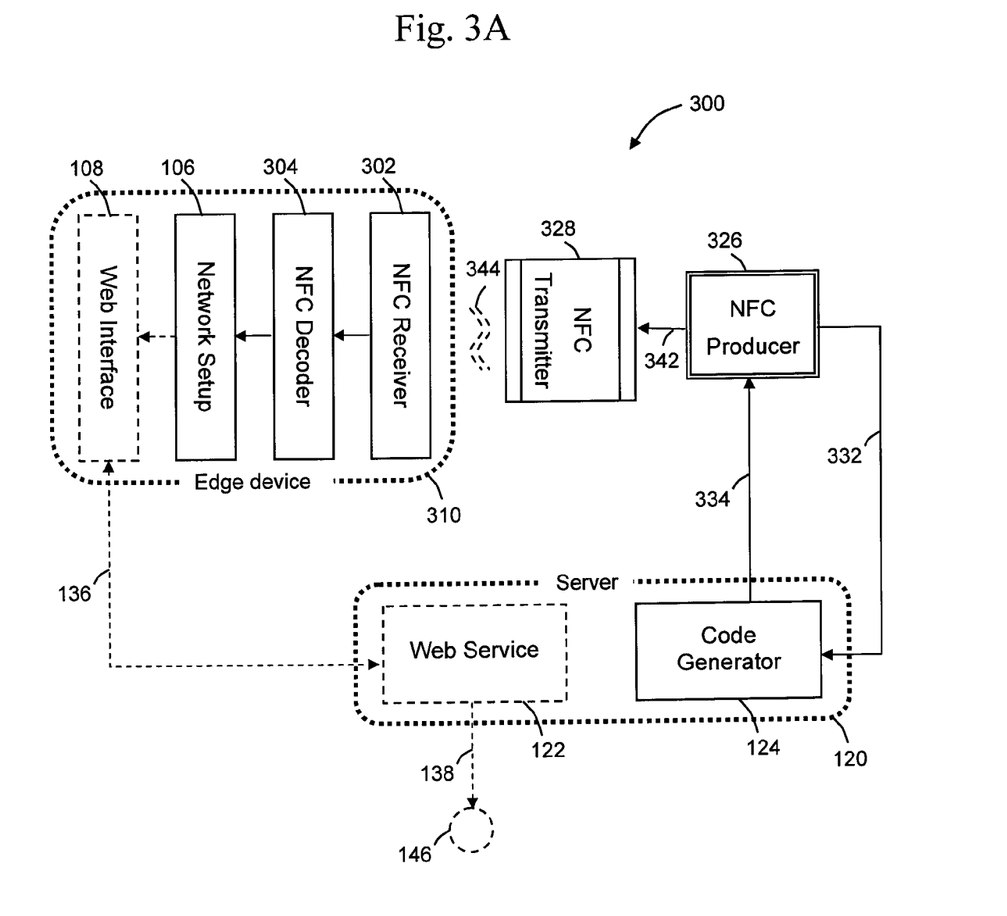
FIG. 3A schematically illustrates a system for independently configuring an edge device with NFC, according to exemplary embodiments of the disclosed subject matter.

FIG. 3A schematically illustrates a system 300 for independently configuring an edge device 310 with NFC, according to exemplary embodiments of the disclosed subject matter.

System 300 further comprises a code generator 124 as a component comprising software and/or hardware for generating configuration data for edge device 310 in an encoded form and/or any suitable form such as text, also referred to as a configuration code. In some embodiments, code generator 124 obtains information for configuring or setting of edge device 310 from a storage device (not shown), where, for example, the information is provided by a user or received otherwise.

In some embodiments, code generator 124 is physically comprised in a server 120, where, optionally or alternatively, code generator 124 is separate from and/or linked with server 120. By way of a non-limiting example, code generator 124 is assumed to be comprised in server 120.

System 300 further comprises an NFC producer 326 as a device or a component capable of and/or configured for producing and/or constructing NFC data according to the configuration code generated by code generator 124. In some embodiments, NFC producer 326 is capable of and/or configured for interacting with code generator 124 for requesting and subsequently receiving configuration code for edge device 310.

In some embodiments, NFC producer 326 provides the NFC data to a portable device or an object capable of and/or configured for transmitting to and/or wirelessly interacting with an NFC receiver, such as a smartphone as known in the contemporary art, collectively referred to as NFC transmitter 328.

Edge device 310 comprises an NFC receiver component 302 designed and/or constructed for receiving NFC data transmitted thereto, and an NFC decoder component 304 for decoding received NFC data to a suitable format and/or arrangement for configuring of edge device 310.

Edge device 310 further comprises a network setup component 106 constructed for setting and/or configuring of edge device 310 for networking according to the data decoded by NFC decoder component 304.

In some embodiments, NFC transmitter 328 and/or NFC receiver component 302 are operable as transceivers. For example, responsive to receiving data from NFC transmitter 328, NFC receiver component 302 sends to NFC transmitter 328 an acknowledgment code (e.g. Ack or Nak as known in the art) by which NFC transmitter 328 may determine whether the data was properly received in NFC receiver component 302.

Thus, in some embodiments, a user, such as a person assigned for configuring edge devices, operates NFC producer 326 to request from code generator 124 a configuration code for edge device 310, as illustrated schematically by an arrow 332. Responsively, code generator 124 provides NFC producer 326 with the configuration code, as illustrated schematically by an arrow 334.

Having acquired the configuration code, NFC producer 326 sends to or otherwise provides the configuration code to edge device 310 by NFC transmitter 328, as illustrated schematically by an arrow 342. Subsequently, the user places or positions NFC transmitter 328 externally to edge device 310 sufficiently close and/or proximate to NFC receiver component 302 so that NFC receiver component 302 can receive data transmitted from NFC transmitter 328, the data transmission illustrated symbolically by curves 344.

It is noted that, in some embodiments, NFC receiver component 302 and/or a part thereof is connected to edge device 310 rather than comprised in edge device 310. For example, NFC receiver componet 302 is an NFC sticker as known in the art which is connected or otherwise linked to edge device 310, collectively referred to also as an NFC tag. Thus, in some embodiments, positioning NFC transmitter 328 sufficiently close and/or proximate to NFC receiver component 302 comprises contacting the NFC tag.

Consequently, edge device 310 receives or captures NFC data by NFC receiver component 302, if necessary decodes the configuration data by NFC decoder component 304, and sets the networking configuration by network setup component 106 according to the configuration data such as by setting an IP. Thus, edge device 310 is operable to participate in a network such as a web network. Generally, without limiting, the IP is set as a static IP.

In some embodiments, edge device 310 provides an indication on the success and/or failure of the configuration, for example, by beeps or lights that are different for success or failure.

In some embodiments, optionally, server 120 is constructed with a web service 122, and edge device 310 is constructed, optionally, with a web interface component 108 capable of and/or configured for network communication such as in a web network.

Thus, in some embodiments, responsive to configuring for networking by network setup component 106, edge device 310 optionally utilizes web interface component 108 to communicate with web service 122, as illustrated by a dashed arrow 136, to notify server 120 about the configuration of edge device 310, such as the IP or other network setting and/or credentials thereof. Responsively, in some embodiments, web interface component 108 acknowledges the settings to edge device 310 and optionally registers edge device 310 in server 120, for example, as a confirmed device.

In some embodiments, the result of the communication between edge device 310 and server 120, either as a success or a determined failure, is indicated, as schematically illustrated by a dashed arrow 138, on a user-readable device such a screen such as a display 146.

In some embodiments, the configuration of edge device 310 comprises, in addition to IP, other data such as credentials of edge device 310. Accordingly, in some embodiments, when communicating with web service 122, edge device 310 provides at least some of the other data to server 120.

It is noted that is set or is operating in a setup mode for configuring of edge device 310, and subsequently, optionally, edge device 310 is set to a normal operation.

In some embodiments, NFC transmitter 328 and NFC receiver component 302 are operable according to ISO/IEC 18092 standard other standards such as ECMA-340, ISO/IEC 21481, ECMA-352 or ISO/IEC 14443. Optionally or alternatively, in some embodiments, other communication techniques or standards are or may be, such as Bluetooth or Wi-Fi (IEEE 802.11).

Figure 3B:
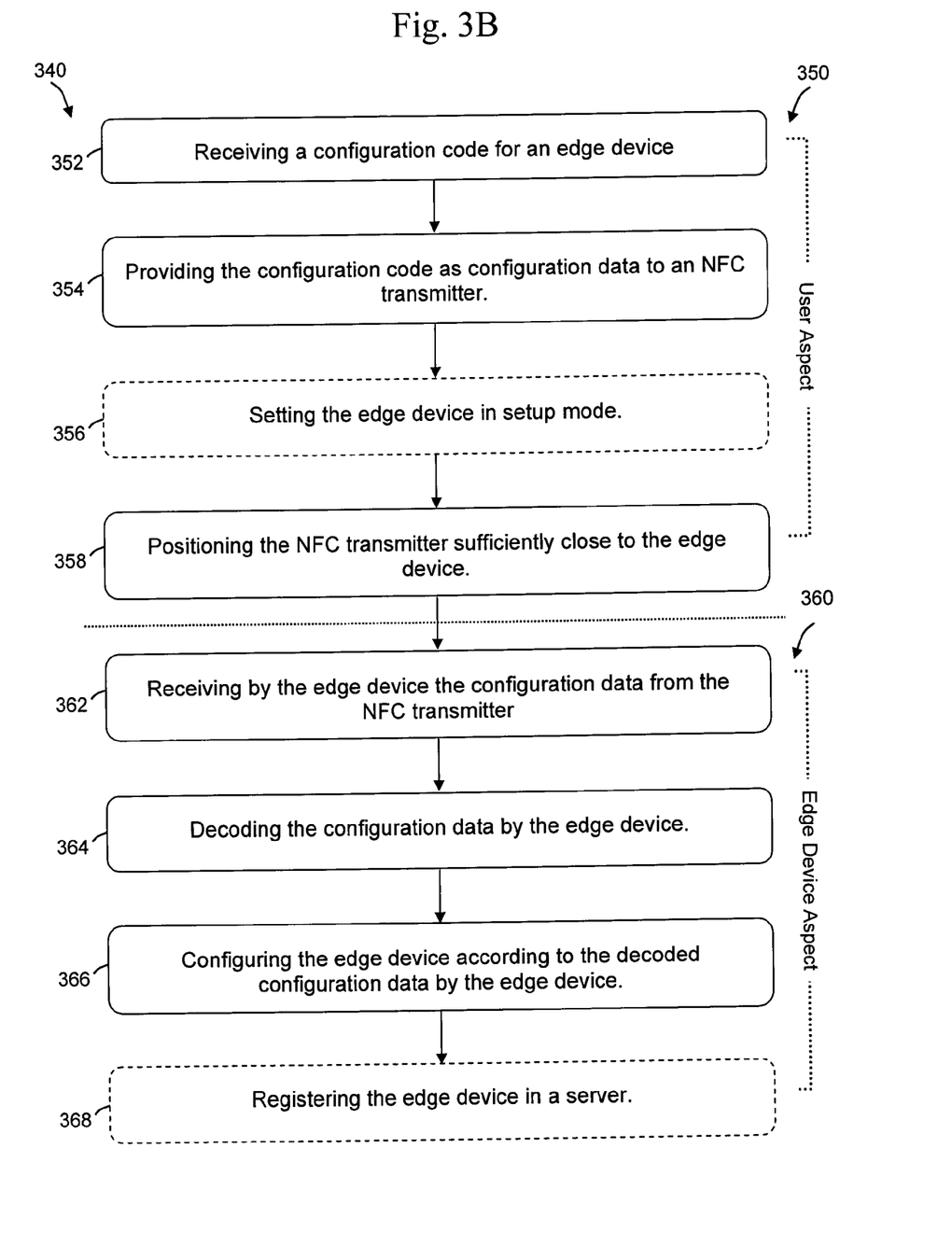
FIG. 3B outlines operations in independently configuring an edge device with NFC, according to exemplary embodiments of the disclosed subject matter.

FIG. 3B outlines operations 340 in independently configuring an edge device with NFC, according to exemplary embodiments of the disclosed subject matter Operations 340 are divided to operations 350 and operations 360 for activities in the user side or aspect and activities in the edge device side or aspect, respectively.

In operation 352 a device operated by a user receives a configuration code for an edge device from a code generator in a decipherable and/or plain data such as text data. In some embodiments, the device requests the configuration code from the code generator which responsively provides the configuration code to the device. Generally the device and the code generator are linked, at least for the interaction therebetween.

In operation 354 the configuration code as configuration data is provided to an NFC transmitter. In some embodiments, when necessary, the configuration code is deciphered and/or transformed to configuration data prior to providing to the NFC transmitter.

In operation 356 in case the edge device is not in a setup mode or the edge device is not operable for configuration, the user or another user sets the edge device in a setup mode, thereby preparing the edge device for configuration.

In operation 358, as the edge device is in a setup mode or operable for configuration, the user or another user positions the NFC transmitter sufficiently close and/or proximate to the edge device to allow communication between the NFC transmitter and the edge device.

In operation 362 the configuration data is received from the NFC transmitter by the edge device.

In operation 364 the configuration data is decoded by the edge device in a format enabling a configuration of the edge device.

In some embodiments the data as received from the NFC transmitter is already arranged to enable configuration of the edge device so that no decoding and/or minimal decoding and/or arrangement is required.

In operation 366 based on suitable program implemented in the edge device, the edge device configures itself according to the decoded configuration data.

The configuration of the edge device comprises an IP and optionally other data such as credentials such as name and password, thereby enabling the edge device to participate in a network.

In operation 368, optionally, the edge device communicates with a server that registers the edge device therein, such as by the IP and/or credentials of the edge device and/or by additional data of the edge device.

In some embodiments, the configuration code represents data that pertains to a site in which the edge device is installed or intended to be installed.

It is noted that operations 340 are applicable to a plurality of edge devices, optionally with some variations. For example, NFC transmitter 328 may receive configuration data for several edge devices that are transmitted separately to each edge device of the plurality of edge devices as suitable for each edge device.

It is noted that configuring an edge device as described above can be used also for modifying a configuration of an edge device, optionally with some variations.

It is emphasized again that instead of NFC other communications methods or techniques may be used.

Figure 4A:
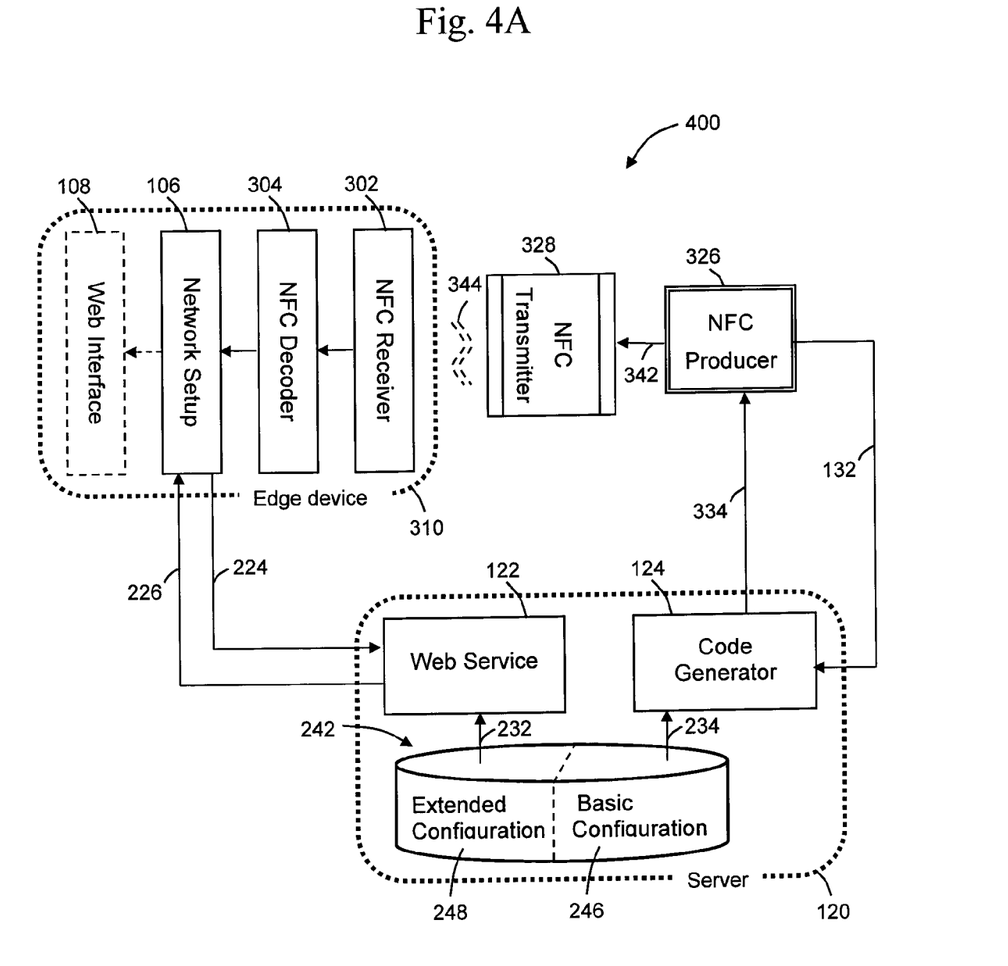
FIG. 4A schematically illustrates a system for dually configuring an edge device in two stages, locally and centrally, according to exemplary embodiments of the disclosed subject matter.

FIG. 4A schematically illustrates a system 400 for dually configuring an edge device in two stages, locally and centrally, according to exemplary embodiments of the disclosed subject matter.

System 400 is principally a variation of system 300 described above, where the components of system 400 are operative similarly to system 200 mutatis mutandis, with some additional components and operations relative to system 300.

The description and operation of system 400 is generally presented below in view of system 300 and system 200.

Reiterating briefly, code generator 124 provides NFC producer 326 with basic configuration data retrieved from storage 242, and the basic configuration data is further provided to NFC transmitter 328 by code generator 124.

NFC transmitter 328 sends the basic configuration data to edge device 310, which is consequently set for a basic networking after decoding the basic configuration data. Thereafter, edge device 310 communicates with server 120, which sends extended configuration data retrieved from storage 242 to edge device 310, which is consequently employed to further configuring of edge device 310 and/or amending the configuration thereof.

Figure 4B:
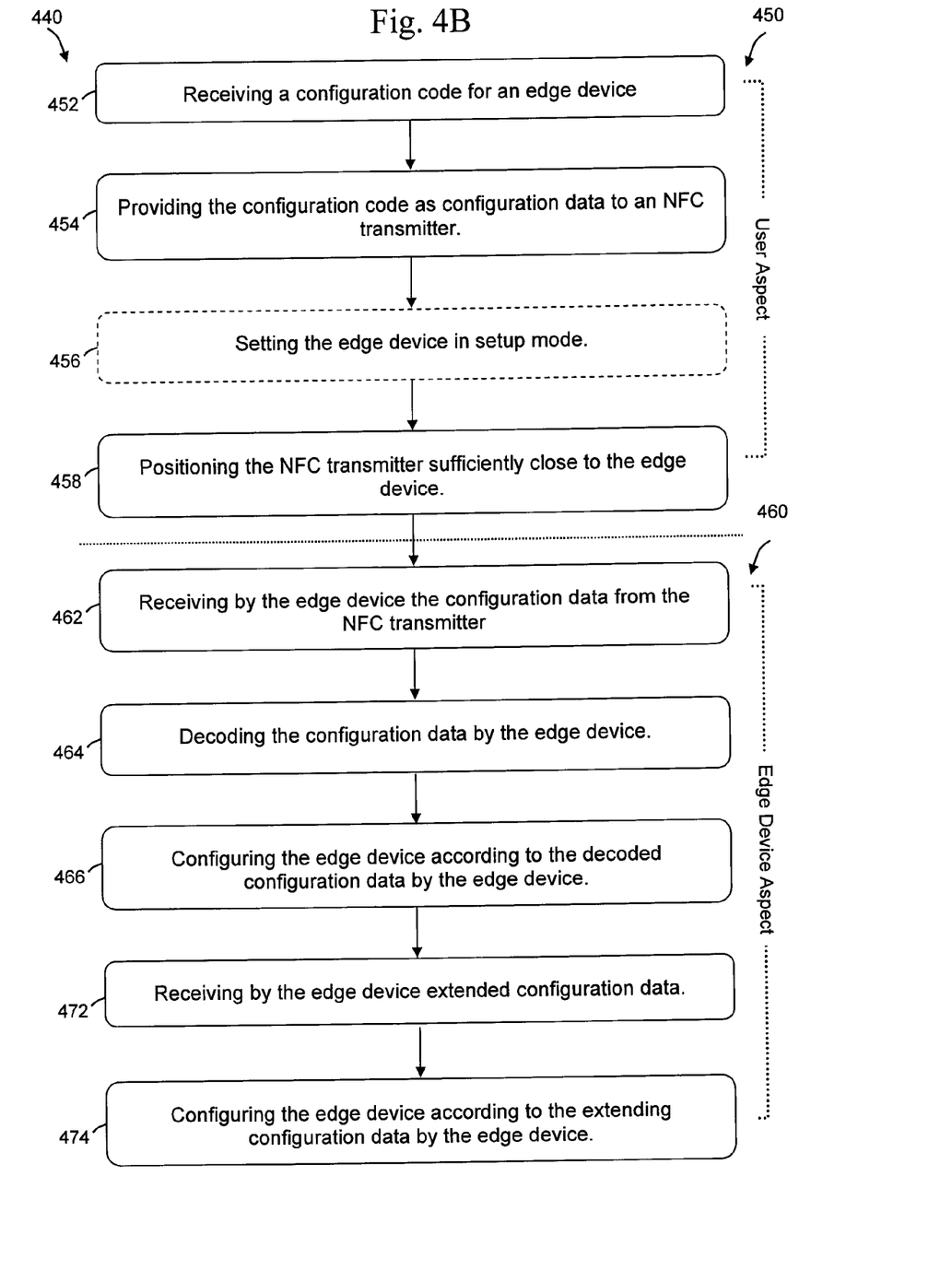
FIG. 4B outlines operations in dually configuring an edge device with NFC, according to exemplary embodiments of the disclosed subject matter.

FIG. 4B outlines operations 440 in dually configuring an edge device with NFC, according to exemplary embodiments of the disclosed subject matter.

Operations 440 are divided to operations 450 and operations 460 for activities in the user side or aspect and activities in the edge device side or aspect, respectively.

Some operations of operations 440 are analogous to corresponding operations 340, and for brevity and clarity are not repeatedly or redundantly described.

Specifically, a first set of operations, namely, operation 452, operation 454, operation 456, operation 458, operation 462, operation 464 and operation 466 are similar and/or analogous to a second set of operations, namely, operation 352, operation 354, operation 356, operation 358, operation 362, operation 364 and operation 366, respectively.

A difference between the first set of operations and the second set of operations is that in the first set of operations the edge device is completely configured and/or sufficiently configured, whereas in the second set of operations the edge device is partially configured with basic configuration data and subsequently further configuration as follows.

Having been configured with basic configuration data that enables the edge device for communication, in operation 472 the edge device receives extended configuration data. For example, the edge device communicates with a server that responsively provides the edge device with extended configuration data.

In operation 474, the edge device is configured according to the extending configuration data by the edge device, thereby extending and/or upgrading and/or substituting the basic configuration of the edge device.

Some variations with respect to the apparatuses and systems described above according to the disclosed subject matter are noted below.

Regarding the camera, in some embodiments, the QR-code cannot or does contain sufficient information so that a plurality of QR-code codes are generated and presented to the camera, possibly in a pre-set order.

In some embodiments, the camera operates in a non-visible range such as UV or IR, and the QR-code code is irradiated with a suitable radiation range so that the camera can identify and/or capture the QR-code.

In some embodiments, configuring the camera further comprises various setting, for example, focus, depth of field, region of interest (ROI) or resolution.

In some embodiments, the edge device is neither a camera nor a device equipped for NFC communication. For example, the device is constructed for voice or other sound monitoring and/or recording. In some embodiments, such devices may be configured by sounding to the device a pattern of frequencies and/or modulated frequency that encodes the configuration data. Optionally, further configuration may set in such techniques, for example, recoding quality, recording intervals or beam forming.

In some embodiments, the server may be constructed in different manners. For example, the code generator is separate from the server. Optionally there is no server per se and the functions of the server are carried out by one or more other apparatuses, optionally linked therebetween.

In some embodiments, the server and/or another suitable component hosts a software application by which an operator may set configuration for an edge device and/or view the setting and/or connections of the edge devices and/or otherwise manage the edge devices.

The constructions of the edge devices are presented as an example, and construction may be varied. For example, two or more components thereof may be combined, at least partially, and/or one of a component thereof may be split to a plurality of components.

In some embodiments, the edge device is constructed to receive configuration data in a different manner, for example, by SMS or email.

It is emphasized that referring herein to an edge device does not preclude any other device configurable by industry-standard and/or off-the-shelf apparatus of components and using the techniques described herein.

Further, the techniques presented above may be used and/or in some embodiments used, possibly with some variations, to configure a device at least separately and independently for other settings other than for and/or in addition to networking.

Figure 5:
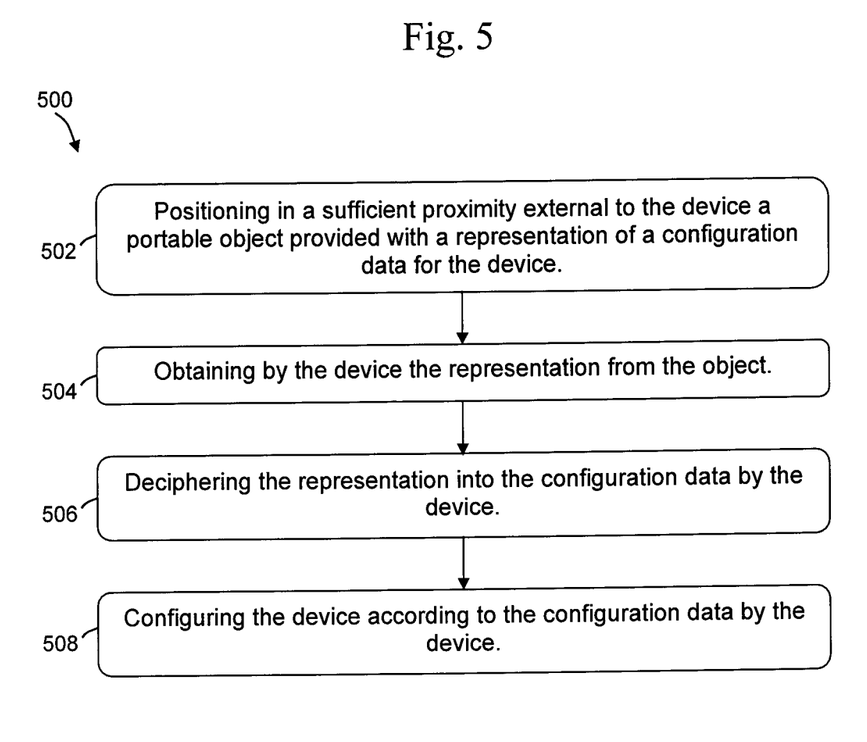
FIG. 5 generally outlines operations in configuring a device, according to exemplary embodiments of the disclosed subject matter.

FIG. 5 generally outlines operations 500 in configuring a device, according to exemplary embodiments of the disclosed subject matter.

In operation 502 a portable object provided with a representation of a configuration data for the device is positioned in a sufficient proximity external to the device.

In some embodiments, the device is devised for configuring by incorporating therein an at least one standard non-custom industrial component, comprising a facility to acquire and decipher a graphical pattern and/or radio transmission that represent the configuration data. In some embodiments, the graphical pattern is a QR-code or a bar-code. In some embodiments, radio transmission is according and/or by NFC communication.

Accordingly, in some embodiments, the representation of a configuration data for the device is according to a standard non-custom industrial practice, such as a QR-code or a bar-code or a radio transmission such a NFC communication.

In operation 504 the device obtains the representation of a configuration data for the device from the object.

In some embodiments, the device is a camera and the object comprises a rendered and/or a displayed a graphical pattern representing the configuration data encoded in the graphical pattern. For example, the object is a paper or screen of a computerized apparatus or any suitable item capable and/or for rendering the graphical pattern thereon.

In some embodiments, the device is equipped with a radio receiver and/or transceiver and the object comprises a transmitter having data elements representing the configuration data. For example, the object is an NFC transmitter having or loaded with data elements representing the configuration data.

In operation 506 the representation is deciphered into the configuration data by the device.

In operation 508 the device configures itself according to the configuration data.

Generally, without limiting, the device is configured for networking, such as by a static IP.

Further, in some embodiments, the device is basically configured for networking, and subsequent to the basic configuration the device communicates by networking with a computer such as a server that provides the device with extended configuration such as an IP by DHCP.

Optionally, in some embodiments, the device is configured for other purposes in addition to and/or without networking.

There is thus provided according to the present disclosure a method for externally configuring a device, wherein the device is devised for configuring, comprising positioning in a sufficient proximity external to the device a portable object provided with a representation of a configuration data for the device, wherein the representation is according to a standard non-custom industrial practice, further obtaining by the device the representation from the portable object, deciphering the representation into the configuration data by the device, and responsively configuring the device according to the configuration data by the device.

In some embodiments, the device is devised for configuring by incorporating therein an at least one standard non-custom industrial component.

In some embodiments, the at least one standard non-custom industrial component comprises a facility to acquire and decipher a graphical pattern that represents the configuration data.

In some embodiments, the at least one standard non-custom industrial component comprises a facility to acquire and decipher radio transmission that represents the configuration data.

In some embodiments, the representation of the configuration data comprises a graphical pattern.

In some embodiments, wherein the graphical pattern comprised a QR-code.

In some embodiments, the graphical pattern comprised a bar-code.

In some embodiments, the representation of the configuration data comprises a representation of data transmittable by radio transmission.

In some embodiments, the representation of the configuration data is transmittable by NFC communication.

In some embodiments, the representation of the configuration data comprises a representation of networking configuration data.

In some embodiments, configuring the device comprises configuring the device for networking.

In some embodiments, configuring the device for networking comprises configuring by an at least an IP.

In some embodiments, configuring the device for networking comprises basic configuring extendable by data obtainable from a computer by communication.

There is thus further provided according to the present disclosure an apparatus constructed for external configuration, comprising a device devised for configuring by incorporating therein an at least one standard non-custom industrial component, and constructed to obtain from a portable object a representation of a configuration data for the device, wherein the representation is according to a standard non-custom industrial practice.

In some embodiments, the at least one standard non-custom industrial component comprises a facility to acquire and decipher a graphical pattern that represents the configuration data.

In some embodiments, the at least one standard non-custom industrial component comprises a facility to acquire and decipher radio transmission that represents the configuration data.

In some embodiments, the device is further constructed to decipher said representation and further configure itself according to the configuration data.

In some embodiments, the device is constructed to configure itself for networking.

In some embodiments, the device is constructed to configure itself with basic configuration extendable by data obtainable from a computer by communication.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, the term 'server' denotes a computerized apparatus providing data and/or operational service or services to one or more other apparatuses.

The term 'configuring' and/or 'adapting' and/or 'constructing' for an objective, or a variation thereof, implies using at least a software and/or electronic circuit and/or auxiliary apparatus designed and/or implemented and/or operable or operative to achieve the objective.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for externally configuring an apparatus, comprising:
   receiving a representation of configuration data for a device as a stand-alone device in a setup mode for self-configuration thereof according to the configuration data;
   positioning in a sufficient proximity external to the device a portable object provided with the representation of the configuration data, wherein the representation is according to a standard industrial practice;
   acquiring by the device the representation from the portable object; and
   deciphering by the device the representation into the configuration data,
   thereby, responsively, the device self-configures according to the configuration data and reverts to normal stand-alone operation thereof irrespective of the portable object.

2. The method according to claim 1, wherein the device is devised for configuring by incorporating therein an at least one standard non-custom industrial component.

3. The method according to claim 2, wherein the at least one standard non-custom industrial component comprises a facility to acquire and decipher a graphical pattern that represents the configuration data.

4. The method according to claim 2, wherein the at least one standard non-custom industrial component comprises a facility to acquire and decipher radio transmission that represents the configuration data.

5. The method according to claim 1, wherein the representation of the configuration data comprises a graphical pattern.

6. The method according to claim 5, wherein the graphical pattern comprised a QR-code.

7. The method according to claim 5, wherein the graphical pattern comprised a bar-code.

8. The method according to claim 1, wherein the representation of the configuration data comprises a representation of data transmittable by radio transmission.

9. The method according to claim 8, wherein the representation of the configuration data is transmittable by NFC communication.

10. The method according to claim 1, wherein the representation of the configuration data comprises a representation of networking configuration data.

11. The method according to claim 1, wherein configuring the device comprises configuring the device for networking.

12. The method according to claim 11, wherein configuring the device for networking comprises configuring by an at least an IP.

13. The method according to claim 11, wherein configuring the device for networking comprises basic configuring extendable by data obtainable from a computer by communication.

14. An apparatus, comprising:
a stand-alone device devised for self-configuration thereof from a setup mode and incorporating therein an at least one standard industrial component,
and constructed to obtain from a portable object a representation of configuration data for the device, wherein the representation is according to a standard industrial practice,
and further constructed to self-configure itself according to the configuration data and, consequently, to revert to normal stand-alone operation thereof irrespective of the portable object.

15. The apparatus according to claim 14, wherein the at least one standard non-custom industrial component comprises to facility to acquire and decipher to graphical pattern that represents the configuration data.

16. The apparatus according to claim 14, wherein the at least one standard non-custom industrial component comprises a facility to acquire and decipher radio transmission that represents the configuration data.

17. The apparatus according to claim 14, wherein the device is further constructed to decipher said representation and further configure itself according to the configuration data.

18. The apparatus according to claim 17, wherein the device is constructed to configure itself for networking.

19. The apparatus according to claim 17, wherein the device is constructed to configure itself with basic configuration extendable by data obtainable from a computer by communication.

20. The method according to claim 1, wherein the device is a camera and the method comprises:
receiving a basic configuration code for the camera;
producing a graphical pattern encoding the basic configuration code;
setting the camera in setup mode;
presenting the graphical pattern in the field of view of the camera;
identifying the graphical pattern by the camera;
decoding the graphical pattern by the camera;
configuring the camera according to the basic configuration code by the camera;
receiving by the camera extended configuration data; and
configuring the camera according to the extending configuration data by the camera, thereby modifying the basic configuration of the camera.

21. The method according to claim 1, wherein the device comprises an NFC receiver and the method comprises:
receiving a configuration code for a device;
providing the configuration code as configuration data to an NFC transmitter;
setting the device in setup mode;
positioning the NFC transmitter sufficiently close to the device;
receiving by the device the configuration data from the NEC transmitter;
decoding the configuration data by the device; and
configuring the device according to the decoded configuration data by the device.

22. The method according to claim 21, wherein the method further comprises:
receiving by the device extended configuration data; and
configuring the device according to the extending configuration data by the device, thereby modifying the configuration of the device.

23. The method according to claim 20, wherein the method further comprises registering the camera in a server.

24. The method according to claim 21, wherein the method further comprises registering the device in a server.

* * * * *